March 26, 1935.  P. SPENCE  1,995,949
REGULATING VALVE
Filed May 29, 1929   3 Sheets-Sheet 3

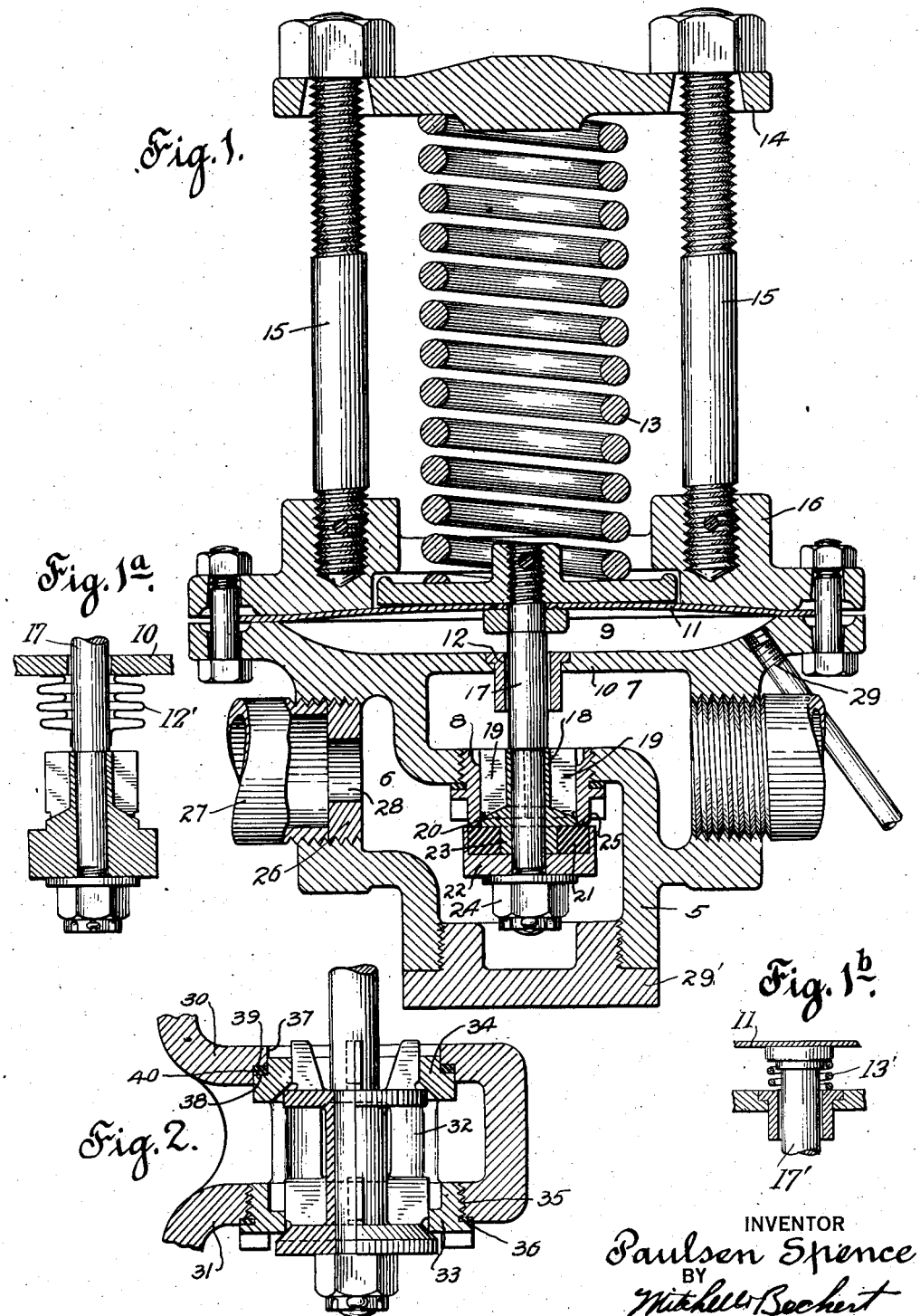
March 26, 1935. P. SPENCE 1,995,949
REGULATING VALVE
Filed May 29, 1929 3 Sheets-Sheet 1
INVENTOR
Paulsen Spence
BY
ATTORNEYS

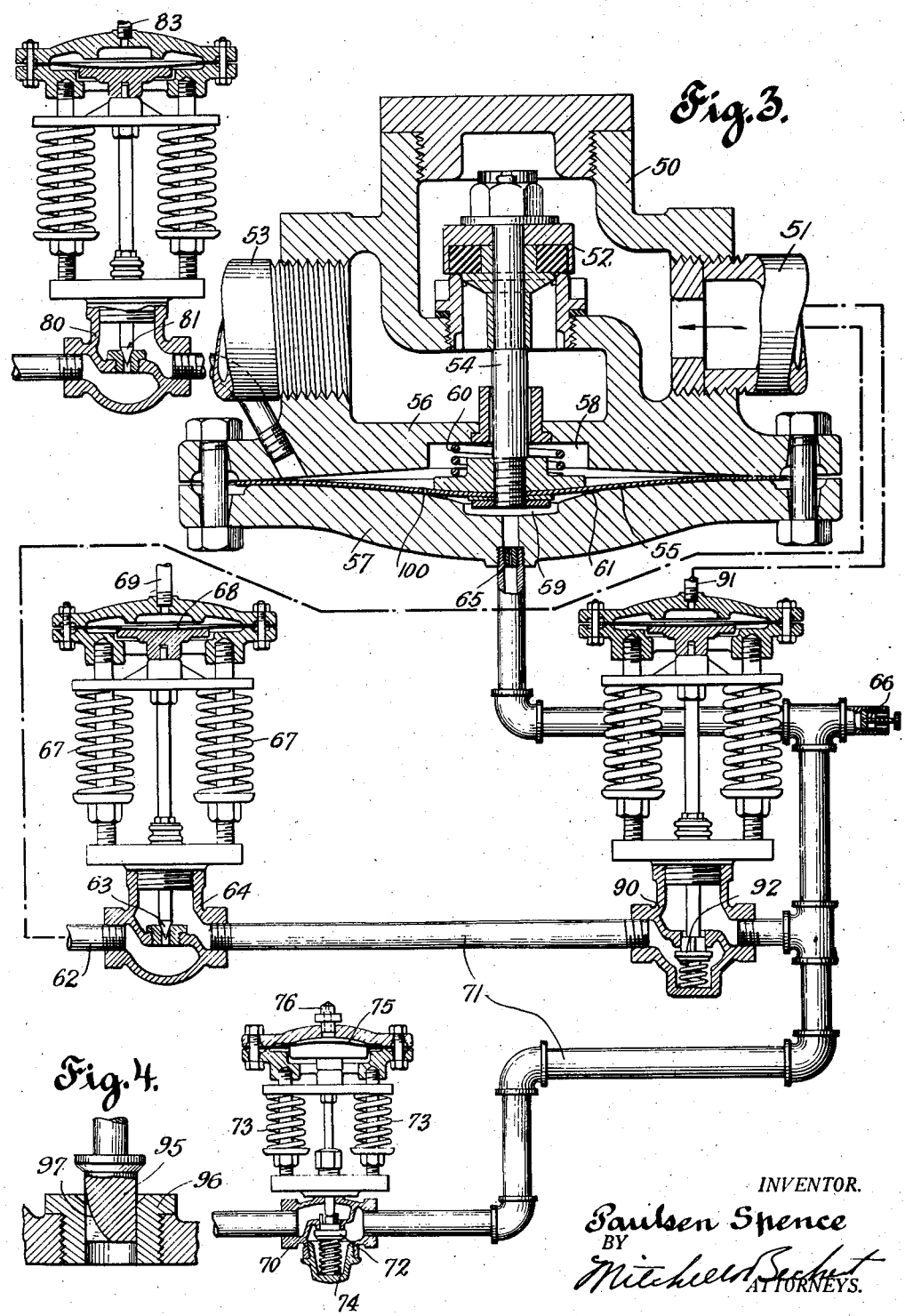

INVENTOR
Paulsen Spence
BY
Mitchell & Bechut
ATTORNEYS.

Patented Mar. 26, 1935

1,995,949

UNITED STATES PATENT OFFICE 1,995,949

REGULATING VALVE

Paulsen Spence, Orange, N. J.

Application May 29, 1929, Serial No. 366,837

15 Claims. (Cl. 50—10)

My invention relates to a regulating valve.

It is the general object of the invention to provide a regulating valve which is simple in construction, positive and safe in operation, and which is not likely to get out of order.

It is another object to improve certain details of construction with a view to longer life of the parts, ease of inspection and repair, and smooth operation.

It is still another object to provide a very flexible type of regulating valve to meet various requirements of use and permitting regulation within close limits.

Other objects and features of structural and functional advantage will appear as the specification proceeds.

In the drawings which show, for illustrative purposes only, preferred forms of the invention—

Fig. 1 is a central sectional view through a regulating valve embodying features of the invention;

Fig. 1ª is a fragmentary sectional view of a modification;

Fig. 1ᵇ is a fragmentary sectional view of a modification;

Fig. 2 is a fragmentary, sectional view of a balanced or double valve illustrating features of the invention;

Fig. 3 is an illustrative view of a regulating valve embodying various regulating features;

Fig. 4 is an enlarged fragmentary sectional view of a modified pilot valve;

Figure 5:
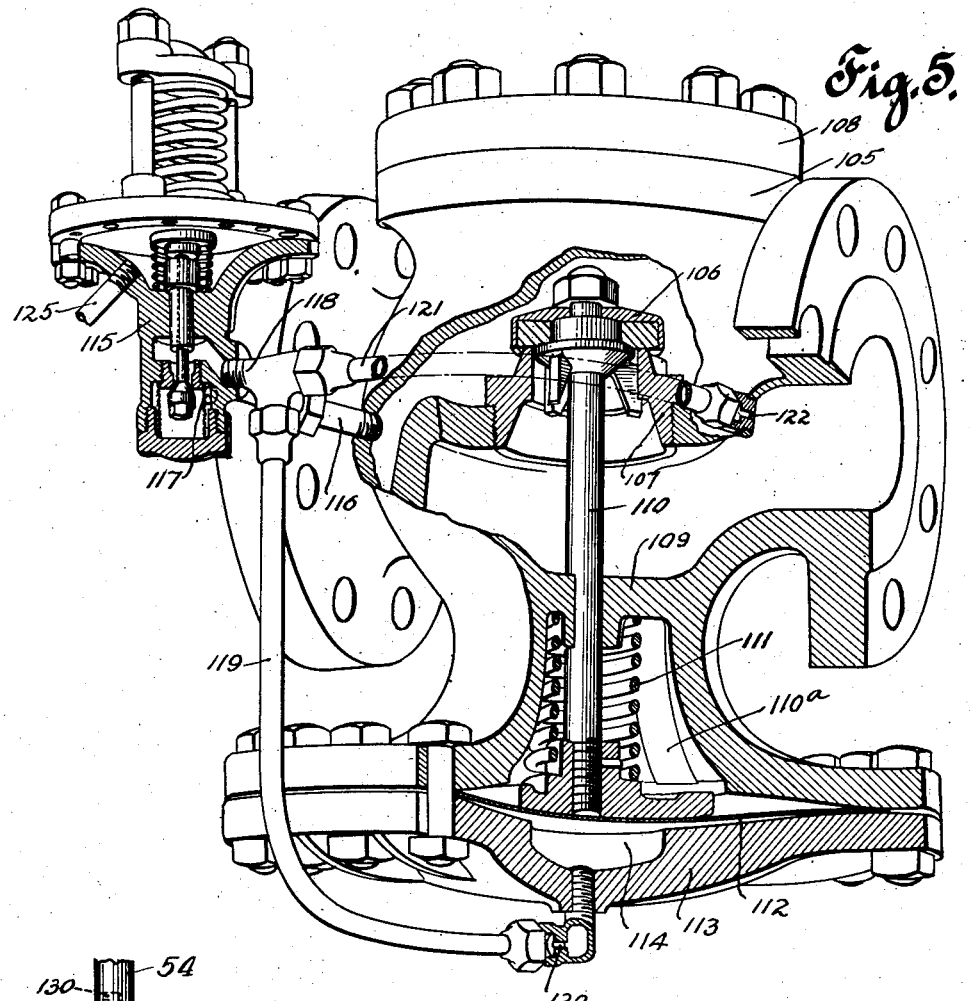
Fig. 5 is a side view in partial section of a convenient form of valve.

In said drawings and referring particularly to Fig. 1, 5 indicates a valve casing having a high pressure side 6 and a low pressure side 7. A valve seat member 8 having a guide bore therethrough affords communication between the chambers 6—7. 9 indicates a diaphragm chamber separated from the chamber 7 by a wall or partition 10, so as to maintain the diaphragm 11 out of direct contact with the main body of fluid passing through the valve. A bleed connection may be provided between the chambers 7—9, and, in the form shown in Fig. 1, I employ a gland 12 fitting a valve stem 17 rather snugly so as to permit a slow leak and thus form a dash-pot to cause a slow regular movement of the valve. The diaphragm 11 is weighted by means such as a spring 13 which bears on top of the diaphragm and against an abutment 14 adjustably held on the rods 15—15, which are in turn carried by a ring 16 constituting the upper part of the diaphragm chamber 9.

In the form shown in Fig. 1, I rigidly attach the valve stem 17 to the diaphragm. The valve stem 17 at the lower portion is guided preferably in the valve seat 8. There is a sleeve 18 fitting on the lower turned down end of the valve stem 17 which sleeve includes guide means such as wings 19—19, which fit within the bore of the valve seat 8 and serve to accurately guide and position the valve stem and valve parts to be described. An auxiliary shut-off or valve 20 may be formed as part of the sleeve 18, and may fit the seat bore rather freely but so as to substantially close the same when the auxiliary shut-off 20 is partially moved into the bore through the seat 8. Beneath the disk 20 is a hard rubber or other form of valve disk 21, which may be carried in a cup 22, and which may surround the lower projection on the sleeve 18. A nut 24 on the end of the valve stem serves to hold the sleeve 18 and its associated parts in position on the valve stem and relatively to the cup 22. It will be noted that before the valve disk 21 seats on the seat portion 25 of the valve seat, the auxiliary shut-off 20 will have already substantially stopped or throttled the flow of fluid through the seat 8. The abrasive action of the fluid, therefore, tends to wear the relatively hard metal of the shut-off 20; and thus saves wear on the disk 21 and the coacting portion of the valve seat.

In those situations where the maximum flow of fluid desired can be readily determined I prefer to throttle the flow of fluid independently of the valve. Throttling may be accomplished by means of a disk 26 placed in the fluid conduit and preferably in the inlet line 27. This disk is provided with a restricted port 28 which will permit the maximum flow of fluid required, and therefore acts as a throttle or pressure reducer so that the pressure differential between the inlet chamber 6 and the outlet chamber 7 will be substantially reduced, and thus wear on the valve seat and valve will be substantially reduced.

When the plug 29' is removed the nut 24 may be removed and the valve parts as well as the seat 8 may be removed through the opening which is made of proper size to permit such removal. Inspection and repair of parts are thus facilitated.

The operation of the valve is as follows:

With the valve in closed position as shown in Fig. 1, there will be no flow of fluid from the high pressure chamber 6 to the low pressure chamber 7. The fluid pressure in the low pressure chamber 7 will serve to hold the diaphragm 11 in elevated position so as to maintain the valve closed so long as the outlet pressure remains above the predetermined maximum controlled by the adjustably mounted spring 13. When the pressure in the outlet side 7 drops, the spring 13 depresses the diaphragm and thus the valve disk 21 is separated from the seat portion 25. There will be substantially no flow of fluid, however, until the disk 21 is well away from its coacting seat portion, for the reason that the auxiliary shut-off disk 20 practically seals the passage through the seat 8. Now, further opening movement of the valve will cause the auxiliary shut-off 20 to be removed from the bore of the seat 8, and the flow of pressure fluid will then begin. If the restricting throttle bore 28 is employed, pressure fluid will be there throttled, and the pressure differential between the seats 6—7 of the valve will thus be reduced, and fluid abrasion will also be reduced to a minimum. Now, when the pressure again rises in the outlet side 7, the diaphragm 11 will be raised against the spring 13 and the auxiliary shut-off 20 will seal or almost completely throttle the flow of fluid through the valve seat 8 and further closing movement will cause the disk 21 to contact with the seat portion 25 and thus seal the passage between the inlet and outlet chambers. Due to the slow leak past the stem 17 the valve will move with a dash-pot action and there will be no hunting or chattering.

Instead of controlling the opening and closing of the valve directly by the low pressure fluid from the chamber 7, I may employ a remote control; for example, as illustrated in my co-pending application, Serial No. 63,920, filed October 21, 1925, the threaded opening 29 is provided for the making of such remote control connection.

When employing a remote control for the valve it is desirable to have little or no communication between the chambers 7 and 9 past the stem 17 and in order to maintain a tight joint and yet permit a free movement of the valve stem I may employ a bellows or sylphon 12' as shown in Fig. 1ª secured to the stem 17 and the partition 10. In Fig. 1ª is shown an alternative type of valve in which the seat guide wings and auxiliary shut-off are all integral.

In some cases it is desirable to have the valve stem 17 movable in one direction independently of the diaphragm 11 rather than have the latter secured to the stem. In Fig. 1ᵇ is shown an arrangement wherein the stem 17' is not connected to the diaphragm 11. A spring 13' may be employed for moving the stem and connected parts when such movement is permitted by the diaphragm. The spring 13' being preferably in the diaphragm chamber 9 is out of the direct path of the steam or other fluid passing through the valve.

In the construction shown in Fig. 2 there is a housing having the walls or partitions 30—31. A valve cage 32 having separate seats 33—34 is secured between the partitions. The cage is fixedly secured at one end as by means of a threaded connection 35 to the partition 31. A suitable gasket 36 may be employed, if desired. The opposite end of the valve cage may fit quite snugly in the bore 37 through the partition 30. The cage is provided with a shoulder 38 and between the shoulder 38 and the counterbored portion 39 of the partition 30, I interpose a resilient gasket 40. This method of construction is important for the reason that the expansion between the walls 30—31 as a unit, and between the valve cage is not always the same. By fixedly securing one end of the cage as by means of the threaded connection 35 and permitting a free or floating connection at the opposite end, as by means of the resilient gasket 40, unequal expansion is taken care of and there is little likelihood of having the parts become broken, or of having a leaking joint. The valve shown in Fig. 2 is claimed in my divisional application, Serial No. 539,481, filed May 23, 1931.

It is to be observed that certain features of the invention herein disclosed are not limited to a regulating valve, and may be advantageously used in connection with other types of valves.

In the regulating valve shown in Fig. 3, the main valve 50 may be and preferably is substantially the same as that shown in Fig. 1, and may embody the modifications of such valve as heretofore described. The valve shown in Fig. 1 is inverted from the position shown in Fig. 3, but in practice it is preferable to arrange the valve in the position shown in Fig. 3 so that the diaphragm chamber may be water-sealed with condensate when steam is the fluid employed in the valve. Since the parts of the main valve shown in Fig. 3 are substantially the same as shown in Fig. 1, no additional description of those parts need be made in connection with Fig. 3.

High pressure fluid enters through the main inlet pipe 51 and after passing the main valve 52 issues through the outlet pipe 53. The valve stem 54 may be connected to the diaphragm 55 and whether or not connected thereto is operated in at least one direction by said diaphragm. The diaphragm 55 is housed in a chamber formed by the upper deck 56 and a cover cap 57. The diaphragm divides the diaphragm chamber into a low pressure chamber 58 and a high pressure chamber 59. A light spring 60, in the chamber 58 and thus out of the path of the fluid flowing through the valve, may be employed for urging the main valve 52 in the closing direction. The valve stem 54 may pass through a gland in the deck 56 with a relatively tight, but sufficiently loose fit so that pressure fluid from the low pressure side 53 of the valve may leak past the valve stem and into the low pressure diaphragm chamber 58. The inner sides of the diaphragm chamber may be provided with abutments 61—61 for limiting the extreme movement of the diaphragm in order to prevent overstraining thereof.

It will be seen that low pressure fluid in the diaphragm chamber 58 together with the spring 60 (when employed) serve to urge the main valve 52 in the closing direction. The diaphragm 55 and consequently the main valve 52 are urged in the valve opening direction by pressure fluid (preferably high pressure fluid) from the main line 51. As shown, high pressure fluid, for example from the main line 51, is led through the pipe 62, thence past the needle pilot valve 63 of the main pilot valve designated generally 64, and thence through piping and a bleed connection 65 leading to the high pressure diaphragm chamber 59, the valve 92 as will be later described being normally open to permit such flow. The pressure fluid after passing the pilot valve 64 may be bled through a suitable restriction such as the needle valve 66. It is to be noted that a much greater quantity of fluid may pass the pilot valve 64 than can escape through the needle valve 66 so that a substantial pressure will be built up and pressure fluid will bleed through the bleed connection or restriction 65 to the high pressure diaphragm chamber.

The pilot valve 64 may be controlled by any suitable means such as springs 67—67 for urging the valve member 63 to open position and means of any suitable type such as a diaphragm 68 for urging the pilot valve member 63 to closed position. The pilot valve 64 may be controlled, for example, from the low pressure side of the main valve 50, and in that case the pipe 69 leading to the chamber of the diaphragm 68 would be connected to the low pressure line 53 of the main valve. The operation of the regulating valve as thus far described is as follows:

Assuming the pressure in the low pressure line 53 to be below the required limit, the diaphragm 68 will be moved upwardly by the springs 67 and the pilot valve 63 will open. High pressure fluid will then pass from the pipe 62 through the pilot valve 64 and a sufficient pressure will build up to cause high pressure fluid to bleed through the restricted bleed connection 65 and into the high pressure diaphragm chamber 69. The diaphragm 55 will then move upwardly against the spring 60 and the pressure in chamber 58 and the main valve 52 will open. High pressure fluid from the main line 51 will then flow past the main valve 52 and into the low pressure line 53. As soon as the proper pressure builds up in the low pressure line 53, the pilot valve diaphragm 68 will be depressed against the spring 67, and the pilot valve member 63 will be seated. Since no more pressure fluid can then pass through the pilot valve 64, the pressure beneath the main diaphragm 55 will be reduced, due to the bleeding out of pressure fluid past the needle valve 66, and, due to the spring 60 (when employed) and the low pressure fluid in the low pressure diaphragm chamber 58, the main valve 52 will be closed. The pressure fluid bleeding past the needle valve 66 may be led to the low pressure side of the main valve or to other region of low pressure. Due to the restricted flow of fluid past the stem 54 into the diaphragm chamber 58 and through the bleed passage 65 the main valve will be moved slowly and smoothly under the influence of the dash-pot created by such restricted flow.

In Fig. 4 is shown a modified type of pilot valve so that equal increments of opening will give substantially equal percentages of increase of fluid flow. This arrangement makes for closer and more accurate regulation of the main valve.

Under some conditions, it is desirable to employ a safety relief valve for quickly releasing pressure in the high pressure diaphragm chamber 59; for example, in case anything should go wrong with the pilot valve 64 and the main valve 52 consequently be held open, the low pressure line 53 would be raised above a desirable or safe limit. In the form shown I employ a relief valve, designated generally 70, connected to the pipe line system 71 in communication with the high pressure diaphragm chamber 59. The valve member 72 of the relief valve 70 is urged toward closed position by means of springs 73—73 and an additional spring 74, if desired. The valve is urged toward open position by suitable means such as a diaphragm 75 which may be acted upon by fluid pressure entering through the connection 76 and in communication with, say, the low pressure line 53 of the main valve 50. Thus, if for any reason the main valve 52 should be held open by pressure fluid in the high pressure diaphragm chamber 59 so that a dangerous or undesirable pressure might build up in the low pressure line 53, the diaphragm 75 of the relief valve 70 would be depressed and the relief valve member 72 moved from its seat against the adjusted springs 73—73 and thus pressure fluid would be vented from the pipe system 71 and from the high pressure diaphragm chamber 59 faster than such pressure fluid could enter through the pilot valve 64. The main valve 52 would then be moved to closed position by means of the low pressure fluid in the low pressure diaphragm chamber 58 and the spring 60 (when employed).

It will be seen that for a considerable differential in pressure between the high pressure line 51 and the low pressure line 53, the regulating valve as controlled by the pilot valve 64 will work satisfactorily, but when there is but a small differential in pressure, for example when the pressure in the main line 51 is, say, 101 pounds, and the pressure in the low pressure line is to be, say, 100 pounds, the fluid pressure on opposite sides of the diaphragm 55 would be almost balanced, and the spring 60 together with the weight of the parts might move the valve 52 to closed position so that a close regulation of a small differential pressure could not be obtained. For such a case where a small differential is to be maintained, I prefer to connect a valve 80 to the low pressure diaphragm chamber 58 as shown. This valve 80 may be in all substantial respects as to construction and control the same as the pilot valve 64 heretofore described, and no separate description thereof need here be given. With the pilot valve 80 in use the valve member 81 will remain open so long as the pressure in the low pressure line 53, to which the inlet pipe 83 is connected, is below that desired, for example 100 pounds. With the valve member 81 open, low pressure fluid is vented from the low pressure diaphragm chamber 58 faster than it can bleed thereinto, past the valve stem 54, and the high pressure fluid in the high pressure diaphragm chamber 59 will maintain the valve 52 in open position. As soon as the pressure in line 53 reaches the desired maximum limit, the valve member 81 will be moved to closed position, thus permitting low pressure fluid to build up in the low pressure diaphragm chamber 58, and thus cause the valve 52 to close (it is assumed that the valve 63 is now closed also). Thus, a very small differential between the high and low pressure sides of the valve may be maintained.

In some situations it is desirable to shut off the main valve 52 regardless of the pressure in the low pressure line 53; that is to say, in some situations it will be undesirable to rob the main line 51 of pressure fluid in order to maintain a desired pressure in the low pressure line 53, which may be an unimportant one, or one in which it is not necessary at all times to maintain a pressure. In order to meet this situation, I employ a vent valve 90 connected in the pipe line system 71 as shown. This valve 90 may be in all substantial respects the same as the valve 70 and no separate description need be given thereof. The connection 91 is connected to the high pressure line 51 so that upon a drop in pressure in the line 51 below a desired limit the valve member 92 will be moved to closed position so as to prevent pressure fluid from the pilot valve 64 from reaching the diaphragm chamber 59. Pressure fluid in the diaphragm chamber 59 will bleed past the needle valve 66 and pressure fluid in the low pressure diaphragm chamber 58 and the spring 60 (when employed) will close the main valve 52 and maintain the same closed so long as the pressure deficiency exists in the high pressure line 51. Under normal conditions the valve 92 will remain open so that the control of the main valve 52 by the pilot 63 or the other valves will not be interfered with.

It is to be noted that all of the relief or safety valves herein disclosed need not be employed simultaneously, though under certain conditions all might be employed.

While the pilot and relief valves and the main valves are shown more or less diagrammatically and being so shown are spread out with the main valve above the pilot and relief valves, it is desirable in practice to position the pilot and relief valves higher than the main diaphragm chambers 58—59 so that when steam is being regulated condensate will collect in the diaphragm chambers 58—59, and thus keep the diaphragm cooler as well as requiring a liquid to pass through the bleed connection 65 and the bleed passage past the valve stem so that the main valve 52 will be somewhat under the influence of a dash-pot in order to cause a smooth action and prevent hunting and chattering.

In order to prevent the lower diaphragm chamber 59 from becoming air-bound, I prefer to provide a very small opening 100 in the diaphragm so that air may pass therethrough and find its way out of the diaphragm chambers. This very small air port will not pass any great quantity of fluid and the action of the valve will not be deleteriously affected.

It will be clear to those skilled in the art that one or more of the control valves herein mentioned may be thermostatically, electrically, or otherwise controlled without departing from the spirit of the invention and the pressure control of such valves has been indicated as a matter of convenience.

In the commercial form of regulating valve illustrated in Fig. 5, the main valve casing 105 is essentially the same as that shown in Fig. 3. The casing is provided with flange fittings so that the valve casing and associated parts may be readily removed from the line in which it may be placed. The main valve 106 and its seat 107 may be removed from the casing after the blank flange 108 is removed. The valve casing has an integral partition 109 through which the valve stem 110 passes with a relatively snug fit, but with sufficient looseness to permit pressure fluid to bleed past the stem from and to the low pressure side 110ᵃ of the diaphragm chamber. A spring 111 urges the main valve 106 toward closed position and is out of the path of fluid passing through the main valve casing. The diaphragm 112 is secured between the main casing and the diaphragm cover flange 113 which completes the high pressure diaphragm chamber 114.

The main valve 106 is controlled by a pilot valve designated generally 115 and which may be controlled by any suitable means. The pilot valve in the present instance is separate from but supported by the main valve casing at the side thereof so that the main valve may be readily inspected or repaired without disturbing the pilot valve, and the pilot valve may be inspected or repaired without disturbing the main valve. As illustrated, a pipe 116 is secured to the valve casing 105 and connects to the high pressure side thereof. The opposite end of the pipe is connected to and opens into the high pressure side of the pilot valve as indicated at 117. A fitting 118 is secured to and connects with the low pressure side of the pilot valve and a pipe 119 connects through a bleed port 120 with the high pressure diaphragm chamber 114. A pipe 121 connects with the pipe 119, or, as specifically shown, with the fitting 118 and is adapted to conduct fluid therefrom through a bleed port 122 to the low pressure side of the main valve casing 105. In the form illustrated, the pilot valve is controlled by fluid pressure entering through the control pipe 125.

The operation is as follows:

With the main valve 106 closed, the pressure drops in the low pressure side of the main valve and when the pilot valve controlled by pressure or otherwise is opened as when the pressure in the line 125 drops and the pilot valve opens and admits high pressure fluid through the pipe 116 past the pilot valve, through the fitting 118, pipe 119, bleed port 120 and to the high pressure diaphragm chamber 114, the pressure builds up relatively slowly beneath the diaphragm 112, and the main valve 106 opens and remains open so long as the pilot valve is open. During the opening of the main valve 106, condensate or fluid in the low pressure side of the main valve bleeds past the valve stem and into the low pressure side of the main valve so that the diaphragm chamber 110ᵃ moves under the influence of a dashpot. When the pilot valve closes, no further high pressure fluid may enter through the pipe 119, and the high pressure fluid or condensate from the high pressure diaphragm chamber 114 passes through the pipe 119 and pipe 121, bleed connection 122, to the low pressure side of the main valve casing. Since both sides of the diaphragm 112 will thus be subjected to substantially equal pressure, the main valve 106 will be closed by the spring 111 and/or by the high pressure fluid passing through the main valve.

In the form illustrated, the pilot valve is supported solely by the pipes 116, 119 and 121 and is off to one side of the main valve so as to render all parts readily accessible. The pilot valve is elevated so as to permit condensate to collect in the high pressure diaphragm chamber 114. The fittings on the pipes 116, 119 and 121 are preferably compression fittings so as to facilitate assembly and disassembly.

Figure 6:
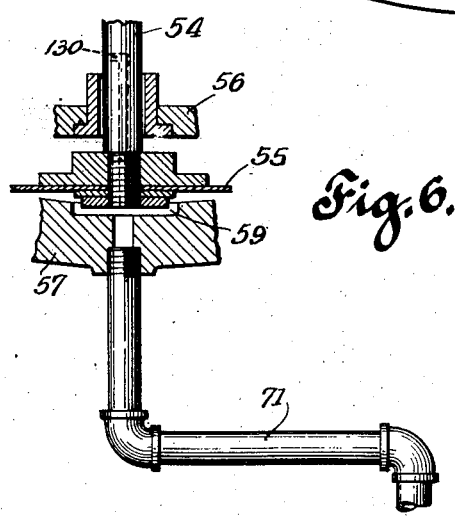
Fig. 6 is a fragmentary sectional view of a modification.

Fig. 6 illustrates a modification of the bleed port connections shown particularly in Fig. 3. It is to be understood, however, that the valve of Fig. 5 may be modified as shown in Fig. 6. As there shown, the pipe 71 for conducting high pressure fluid to the high pressure chamber is not provided with any bleed port, and there is a free flow of high pressure fluid from the pilot valve to the high pressure diaphragm chamber. The valve stem 54 is provided with a bleed passage 130 which opens into the high pressure diaphragm chamber and above the partition 56 into the low pressure side of the main valve casing. Thus, when the flow of high pressure fluid through the pipe 71 is cut off as by means of the pilot valve, fluid is bled through the passage 130 into the low pressure side of the main valve casing so as to permit the pressures on opposite sides of the diaphragm to become equalized and thus permit the valve to close.

While the invention has been described in considerable detail and various modifications shown and various devices shown to meet varying situations, it is to be understood that many changes, modifications, omissions and additions may be made without departing from the spirit of the invention as defined in the appended claims.

I claim:

1. In a regulating valve, a valve casing having a high pressure side and a low pressure side, a diaphragm having a high pressure side and a low pressure side for controlling said main valve, means for bleeding high pressure fluid to the high pressure side of said diaphragm, means for bleeding low pressure fluid to the low pressure side of said diaphragm, an automatic control valve interposed in said first mentioned means for stopping the flow of high pressure fluid to the high pressure side of said diaphragm, and a bleed connection for bleeding high pressure fluid from the high pressure side of said diaphragm for permitting said main valve to be moved in one direction.

2. In a regulating valve having a high pressure side and a low pressure side, a valve for controlling the flow of fluid from the high pressure side to the low pressure side, a diaphragm for actuating said valve, means for conducting high pressure fluid to the high pressure side of said diaphragm, means for conducting low pressure fluid to the low pressure side of said diaphragm, means for bleeding high pressure fluid from the high pressure side of said diaphragm, and means for quickly venting high pressure fluid from the high pressure side of said diaphragm for permitting said main valve to close.

3. In a regulating valve, a valve having a high pressure side and a low pressure side and a valve member for controlling the flow of fluid from one side of said valve to the other, a diaphragm for actuating said valve, means for conducting high pressure fluid to the high pressure side of said diaphragm, means for bleeding high pressure fluid from the high pressure side of said diaphragm, means for conducting pressure fluid from the low pressure side of the valve to the low pressure side of said diaphragm, and means for venting low pressure fluid from the low pressure side of said diaphragm for permitting said diaphragm to move said valve to open position.

4. In a regulating valve, a valve casing having a high pressure side and a low pressure side, a removable main valve and seat for controlling communication between the sides of said valve casing, said casing having an opening through which said valve and seat may be bodily removed, said casing having a diaphragm chamber formed integrally therewith, a cover for said diaphragm chamber removably secured thereto, a diaphragm in said diaphragm chamber, a partition member integral with said casing and separating said diaphragm chamber from the remainder of said valve casing, said partition member having a valve stem passage therein, a valve stem extending through said passage, a spring in said diaphragm chamber for urging said stem in one direction, said spring being located between said partition member and said diaphram, said stem being movable in the opposite direction by said diaphragm, and means for conducting pressure fluid to at least one side of said diaphragm, and an automatic pilot valve for controlling the flow of fluid to said side of said diaphragm.

5. In a regulating valve, a valve casing having a high pressure side and a low pressure side, a valve for controlling passage of fluid from one side of said valve to the other, said valve casing having a diaphragm chamber formed integrally therewith, a partition between said diaphragm chamber and the remainder of said valve casing and formed integrally with the latter, said partition having a passage therethrough for a valve stem, a valve stem connected to said valve member and passing through said passage into said diaphragm chamber, a spring for urging said valve and stem in one direction, a diaphragm in said diaphragm chamber for urging said valve and stem in the opposite direction, a cover member for said diaphragm chamber, means having a bleed passage for conducting pressure fluid to one side of said diaphragm, said means including an automatic pilot valve, and passage means for conducting pressure fluid to the other side of said diaphragm for the purpose set forth.

6. In a regulating valve, a valve casing having a high pressure side and a low pressure side, a valve member for controlling the flow of fluid from one side of said valve casing to the other, said valve casing having a diaphragm chamber formed integrally therewith, a partition integral with said casing and dividing said diaphragm chamber from the remainder of said valve casing, said partition having a passage therethrough for a valve stem, a valve stem secured to said valve member and extending through said passage, a spring in said diaphragm chamber for urging said valve and stem in one direction, a diaphragm in said chamber for urging said valve in the opposite direction, a cover for said diaphragm chamber, a pilot valve, means for conducting pressure fluid from the high pressure side of said valve casing to said pilot valve, means for conducting pressure fluid from said pilot valve to one side of said diaphragm, said last mentioned means including a bleed port for the slow passage of fluid, means including a bleed port for conducting pressure fluid from said side of said diaphragm, passage means for conducting pressure fluid to the opposite side of said diaphragm, and means for actuating said pilot valve.

7. In a regulating valve, a valve casing having a high pressure side and a low pressure side, a valve member for controlling the flow of fluid from one side of said valve to the other, a diaphragm chamber formed integrally with said valve casing, a partition member integral with said valve casing for dividing said diaphragm chamber from the remainder of said valve casing, said partition having a passage therethrough for a valve stem, a valve stem extending through said passage into said diaphragm chamber, said stem being connected to said valve member, said passage in said partition member being of a size to permit a slow leak of pressure fluid past said valve stem, a spring in said diaphragm chamber for urging said valve and stem in one direction, a diaphragm in said diaphragm chamber, a cover for said diaphragm chamber, a conductor including a bleed passage for slowly bleeding pressure fluid from the high pressure side of said valve casing to the side of said diaphragm opposite said valve member and stem, a pilot valve for controlling the flow of fluid through said conductor, and a conductor including a second bleed port for conducting therethrough fluid from said diaphragm.

8. In a regulating valve, a valve casing having a high pressure side and a low pressure side, a valve member for controlling the passage of fluid from one side of said valve casing to the other, a diaphragm chamber, a diaphragm therein, a valve stem secured to said diaphragm and secured to said valve member, means for conducting high pressure fluid to one side of said diaphragm, and a bleed connection for conducting high pressure fluid from said one side of said diaphragm to the low pressure side of said valve casing, and an automatic pilot valve controlled by the pressure on the low pressure side of said casing for controlling the flow of high pressure fluid to said one side of said diaphragm.

9. In a regulating valve, a valve casing having a high pressure side and a low pressure side, a valve member for controlling the passage of fluid from one side of said valve casing to the other, a diaphragm having a high pressure side for controlling said valve member, said valve member having a stem secured to said diaphragm, a pilot valve for controlling the passage of pressure fluid to the high pressure side of said diaphragm, said valve stem having a bleed passage therein for conducting pressure fluid from the high pressure side of said diaphragm to the low pressure side of said valve casing.

10. In a regulating valve, a valve having a high pressure side and a low pressure side, a valve member, a diaphragm for actuating said valve member, and a bleed port for conducting a flow of high pressure fluid from the high pressure side of the valve to one side of said diaphragm and also conducting a flow of high pressure fluid from said one side of said diaphragm to the low pressure side of the valve, and a connection between the low pressure side of said valve and the other side of said diaphragm.

11. In a regulating valve, a valve chamber having a high pressure side and a low pressure side, a diaphragm chamber having a high pressure side and a low pressure side, a valve member within said valve chamber, a diaphragm within said diaphragm chamber, means whereby said diaphragm will actuate said valve member, an automatic pilot valve, said pilot valve comprising a spring actuated valve member controlled by fluid pressure, a pipe connecting the high pressure side of said valve chamber to one side of said pilot valve, a pipe connecting the other side of said pilot valve to the high pressure side of said diaphragm chamber, a bleed connection for bleeding high pressure fluid from the high pressure side of said diaphragm chamber, means for conducting pressure fluid from the low pressure side of said valve chamber to the low pressure side of said diaphragm chamber, and a pipe connection for leading fluid under pressure to said pilot valve to control said pilot valve.

12. In a regulating valve, a valve casing having a high pressure side and a low pressure side, a valve head cooperating with said casing to form a valve, a spring for closing said valve, a diaphragm having a high pressure side and a low pressure side for controlling said valve, said valve being opened by the pressure on the high pressure side of said diaphragm, fluid conducting means for leading fluid from the high pressure side of said casing to the high pressure side of said diaphragm, an automatic pilot valve interposed in said conducting means and controlled by the pressure in the low pressure side of said casing, means for bleeding fluid from the low pressure side of said casing to the low pressure side of said diaphragm, and bleed means for bleeding fluid from the high pressure side of said diaphragm.

13. In a regulating valve, a valve casing having a high pressure side and a low pressure side, a valve member for controlling the flow of fluid from one side of said valve to the other, a diaphragm chamber, a valve actuating diaphragm therein, a pilot valve, pipe conduits on the exterior of said valve casing and connected to said pilot valve, said pipe conduits being connected directly to the high pressure side of said valve casing, directly to the low pressure side of said valve casing and directly to one side of said diaphragm chamber, and detachable pipe connecting means to permit said pilot valve to be detached without disturbing the connections to said valve casing and diaphragm chamber.

14. In a regulating valve having a high pressure side and a low pressure side, a main valve for controlling the flow of fluid from the high pressure side to the low pressure side, fluid pressure actuated means for moving said main valve in at least one direction, means for conducting pressure fluid to one side of said fluid pressure actuated means to urge said main valve toward open position, a pilot valve for normally controlling the pressure of said pressure fluid on said one side of said fluid pressure actuated means, and an automatically actuated relief valve operated by means independent of the pressure fluid on said one side of said fluid pressure actuated means for freely venting the pressure fluid from said one side of said fluid pressure actuated means for permitting said main valve to close.

15. In a regulating valve having a high pressure side and a low pressure side, a main valve for controlling the flow of fluid from the high pressure side to the low pressure side, fluid pressure actuated means for moving said main valve in at least one direction, fluid pressure conducting means for conducting pressure fluid to one side of said fluid pressure actuated means to urge said main valve toward open position, means for urging said main valve toward closed position, a pilot valve and constant bleed means for normally controlling the pressure of said fluid pressure on said one side of said fluid pressure actuated means, and an automatic relief valve operated by means independent of the pressure fluid on said one side of said fluid pressure actuated means for freely venting pressure fluid from said one side of said fluid pressure actuated means for permitting said valve to close.

PAULSEN SPENCE.